United States Patent Office 3,491,086
Patented Jan. 20, 1970

3,491,086
METAL-POLYSACCHARIDE COMPOSITION AND ITS PREPARATION AND USE
Muerner S. Harvey, Plainview, Tex., assignor to Harvest Queen Mill & Elevator Company, Plainview, Tex., a corporation of Texas
No Drawing. Filed Sept. 29, 1966, Ser. No. 584,050
Int. Cl. C08b 19/00; B01j 11/00; B01d 53/00
U.S. Cl. 260—233.3                    15 Claims

ABSTRACT OF THE DISCLOSURE

The composition obtained by adding aqueous solutions of a base and a metal salt to an aqueous mixture containing a quantity of a gelatinized polysaccharide or polysaccharide containing material. The pH of the resulting mixture is adjusted to a value of within about two units from pH 7, and a coagulum is formed. The coagulum is essentially water insoluble and has a substantial particle size, e.g., on the order of about one millimeter in diameter or larger. It is recovered, as by filtration or centrifuging, and dried.

---

The present invention relates to a metal-polysaccharide composition, as well as to a method of preparing and using same.

Briefly, the composition of the present invention is obtained by adding aqueous solutions of a base and a metal salt to an aqueous mixture containing a quantity of a gelatinized polysaccharide or polysaccharide containing material. The pH of the resulting mixture is adjusted to a value within about two units from neutral and a coagulum is formed. The coagulum is essentially water insoluble and has a substantial particle size, e.g., on the order of about one millimeter in diameter or larger. It is recoverd by filtration or centrifuging, and dried.

A use of the metal-polysaccharide compound of the present invention is for removal of $H_2S$ and similar substances (e.g., mercaptans) from sour gas to sweeten it. Where sour natural gas, containing $H_2S$ and/or other sulfur containing souring materials, is permitted to flow intimately through, past and about this product, the effluent gas is found to have a materially reduced content of $H_2S$ and/or other sulfur containing materials.

It further appears that the metal-polysaccharide of the present invention may be useful as a soil nutrient to provide trace metals for the soil, as an ion exchange medium, as an absorbing medium useful in chromotography, and as a catalyst or an intermediate for catalyst preparation.

Certain processes are known in the prior art for the preparation of colloidal suspensions of metal containing compositions from low molecular weight starch derivatives. It is also known that metal hydroxides and a starch material may be separately prepared and then combined to further form suspensions. In such prior art processes, however, the products characteristically have extremely small particle sizes, e.g., colloidal and are often of unstable composition.

The precise chemical formula of the composition made by the prior art processes referred to above is not known.

Unlike the prior art, the process of the present invention involves adding solutions of a metal salt and a polysaccharide, such as starch, to form a non-precipitating and homogeneous preparation, from which a large particle sized, stable metal-polysaccharide composition is precipitated under controlled conditions.

The improved method of the present invention not only results in more uniformity and stability in product manufacture, but also produces a differing product having a substantial particle size, as contrasted to the much smaller particle, typically colloidal, that is typical of the prior art.

An object of the present invention is to provide a novel metal-polysaccharide composition.

An additional object is to provide a process for making the metal-polysaccharide composition referred to in the preceding object.

Yet another object is to provide a method of treating sour gas through use of the composition referred to above in order to remove $H_2S$ and similar substances from the gas.

A polysaccharide, a base, and a metallic salt are necessary starting materials. The polysaccharide (e.g., grain sorghum starch) should be gelatinized, that is, it should be in a partially degraded condition that is typical of a gelatinized starch. Polysaccharide may be gelatinized by various methods well known in the art, e.g., starch may be gelatinized by boiling it with water for a moderate period of time, for example, about ten minutes. The resulting suspension of gelatinized polysaccharide in water is adjusted to a moderate temperature (e.g., 60° C.) and a quantity of a metal salt in solution (e.g., ferric chloride) is added to the suspension while stirring it. The pH of the mixture at this point will normally be substantially below the neutral point, typically about pH 2.

Thereafter, a suitable base (e.g., aqueous ammonia) is added to the suspension, the pH being checked at regular intervals, until the pH moves closer to the neutral point, e.g., about pH 5 upward, at which point a precipitate characteristically appears. As more base is added, more and more precipitate forms until, at a pH not far removed from neutral, large clumps appears. Gentle stirring is continued, with addition of such base as is necessary to keep the pH at a desired level, until the maximum yield of product having the desired particle size is obtained. Thereafter, the precipitate is allowed to settle and the clear supernatant poured off. The precipitate is then washed by well known techniques until the wash water indicates the washing to be substantially complete.

After washing, the coagulum is collected by filtering or other standard recovery techniques. In most instances, the coagulum is then dried, as by heating it in an oven at between about 70° C. and 100° C.

The resulting dried product may be used in the form of comparatively large clumps of coagulum or it may be ground and screened to a desired particle size.

The resultant quantity of metal contained in the dried coagulum varies with the specific starting materials selected, the original concentrations, and the subsequent treatment. By way of illustration, where ferric chloride, gelatinized grain sorghum starch, and ammonium hydroxide are the starting materials, the iron content (on the basis of the ratio of the weight of elemental iron to the total weight of the dried sorghum starch) in the resulting compound ranges from about 7 to about 35 percent, depending upon the concentrations of the reactants.

If desired, in the production of the coagulum, the mineral salt may be added after the base instead of before. In some instances, best results will be obtained when using one order of mixing, while with other starting materials, better results may be had by using the reverse order.

For use as a sour gas sweetener, the coagulum of the present invention may be brought into contact with sour natural gas. The coagulum removes hydrogen sulfide and mercaptans to sweeten the gas.

The following examples are given to explain in more detail this invention. It is not intended that they be considered as limiting the scope of the invention since they are by no means exhaustive.

EXAMPLE 1

A quantity of 100 grams of hexane-extracted sorghum flour (i.e., derived from grain sorghum) are mixed with 500 milliliters of demineralized water to form a slurry.

The slurry is added to 10 liters of boiling water in an open vessel and the resulting suspension is brought to its boiling point and boiled gently for 10 minutes, after which the suspension is cooled to about 70° C. by further adding water at room temperature. Then, 100 milliliters of a saturated solution of ferric chloride is added while stirring the suspension. At this point the suspension will be observed to have a pH of about 2 to 3.

Aqueous ammonia (concentrated ammonium hydroxide which has been diluted 1:4, by volume, with water) is then added to the suspension while stirring. The pH is checked at regular intervals until sufficient ammonia has been added to obtain a pH of 8.

At or about pH 6, a precipitate is observed to form. At or about pH 8, the precipitate has assumed the form of clumps on the order of one to two millimeters diameter, and the suspension will have taken the form of a relatively clear supernatant carrying large clumps of the coagulum.

After pH 8 is reached, gentle stirring is continued for about 20 minutes, after which the coagulum is allowed to settle. The clear supernatant is then poured off, and the precipitate is resuspended in five liters of demineralized water. The resulting suspension is gently stirred for 10 minutes, and again the coagulum is permitted to settle. Washing of the precipitate is continued by repetition of this method until a sample of the supernatant is found to contain a very low concentration of chloride ion, which indicates that washing is substantially complete.

After washing, the suspension is filtered, using filter cloth in a perforated basket centrifuge. The coagulum so collected is dried on open trays in an oven at about 70° C. After drying, the coagulum is ground and screened to desired size.

EXAMPLE 2

The procedures of Example 1 are repeated, except that 100 grams of defatted precooked sorghum flour is utilized in place of the sorghum flour of Example 1. The precooking makes it possible to eliminate preliminary gelatinization steps. Accordingly, 100 grams of defatted precooked sorghum flour is mixed with 10 liters of water at about 70° C. to form a suspension; 100 milliliters of saturated ferric chloride solution is added while stirring the suspension; and aqueous ammonia (diluted 1:4 with water) is added and the process completed in accordance with the steps explained in Example 1.

In either Example 1 or 2, if the process is stopped at or about a pH 6, the supernatant liquid is dark brown, indicating that the colloidal material is present in substantial quantity. Thus, stopping at or about a pH 6 would result in a considerable waste of iron.

Also in connection with Examples 1 and 2, if pH is increased to 9 or higher by the addition of excess aqueous ammonia, a decrease in the particle size and an increase in settling time results, and the coagulum suspension is made more difficult to filter. If the pH is increased to over about pH 10, the product assumes a form where it becomes but a thin paste, instead of a coagulum.

Maintaining the suspension of Examples 1 and 2 at about 70° C. after pH 8 is reached has the effect of adding stability to the coagulum and of making it easier to wash and filter. It is preferred that the temperature of the suspension not be raised much above 80° C., however, since at such higher temperatures particle size decreases and the suspension tends to become colloidal.

EXAMPLE 3

A quantity of 100 grams of a food grade, raw corn starch is dispersed in a 0.5 percent by weight sodium hydroxide solution with stirring, and starch swelling is observed in a relatively short time. After this swelling, a saturated solution of ferric chloride is added with stirring, addition continuing slowly until pH is decreased from pH 14 to pH 8. Somewhat above pH 8, a coagulum begins to form and at pH 8, a large coagulum, quite similar to that obtained in Examples 1 and 2, has been obtained. The coagulum is thereafter processed in the same manner as in Examples 1 and 2.

EXAMPLE 4

The process of Example 1 is repeated, except that the starting material is a wheat flour of the type ordinarily obtained in a grocery store for cooking purposes. The results are somewhat similar to those of Example 1; however, the coagulum begins to form at a pH of just below about 8, instead of a pH of about 6.

EXAMPLE 5

Example 1 is repeated but the starting material is an uncooked grain sorghum starch. It is processed in the same manner as in Example 1, and a similar product is obtained.

EXAMPLE 6

Example 1 is repeated, but with a starting material of waxy sorghum starch. This is a highly branched form of starch containing the polysaccharide amylopectin, which is capable of retaining water better than ordinary sorghum starch. The results obtained are similar to those of Example 1.

EXAMPLE 7

Example 1 is repeated, except that Guar gum (hydrophilic) Stein-Hall was utilized as a starting material instead of the sorghum starch. This Guar gum material is a saccharide polymer of 84% D-mannose and 16% D-galactose. The results obtained are quite similar to those of Example 1.

EXAMPLE 8

Example 1 is repeated, except that methyl cellulose is used as the starting polysaccharide material. The resulting product is similar to that obtained in the preceding examples; however, the coagulum of this example is seen to exhibit somewhat more stability to a cycling of pH from 8 to 10 and back.

EXAMPLE 9

Example 2 is repeated, except that a steam cooked sorghum flour is utilized as the starting material. This material is quite high in its percentage content of amylose polysaccharide, which has long unbranched chains, and it contains some bran. With this starting material, not all of the starch is gelatinized. The results are substantially the same as obtained in Example 2. The processing of this example can be materially simplified by aging the coagulum at a temperature between 60° C. and 80° C.

EXAMPLE 10

Example 2 is repeated, except that a pregelatinized waxy corn starch is used as a starting material, and aqueous ammonia is added to the starch first, followed by addition of the solution of ferric chloride. The pH in this instance is brought from about pH 10 down to about pH 8. The coagulum forms at or about pH 9.5 and settles quickly, indicating that it has a high density. If more ferric chloride is added at or about pH 9, the particle size decreases; however, the supernatant liquid is less murky at the pH 9 level than at the pH 10 level, indicating that a more complete precipitation occurs at the pH 9 level. Ultimately, pH is lowered to pH 8 and the coagulum is recovered as in Examples 1 and 2.

EXAMPLE 11

Example 2 is repeated, except that praseodymium chloride (green) is added in place of the ferric chloride of that example. A light green floc forms when the salt is mixed with the cooked flour suspension. On addition of more starch (cooked sorghum) more floc forms. Addition of ammonia until the pH reaches a level of 8 results in a precipitate of material size having formed, although the supernatant will still have a light green tint. The precipitate or coagulum is recovered as in Example 2.

EXAMPLE 12

The preceding example is repeated, except neodymium chloride (violet) is used in place of the praseodymium. The same results are achieved, except the floc involved is a light violet color instead of green.

EXAMPLE 13

Example 2 is repeated, except with cerium (III) chloride. Results obtained with ammonium hydroxide are rather disappointing; accordingly, sodium hydroxide is used instead. Some precipitation is obtained which is recovered as coagulum; but the lack of clarity of the supernatant liquid indicates that yield loss is caused by formation of considerable numbers of very small particles.

EXAMPLE 14

Example 2 is repeated sequentially with the following material used in place of iron (III) chloride: titanyl sulfate, copper sulfate, indium chloride, aluminum sulfate, copper nitrate, cobalt nitrate, nickel nitrate, nickel chloride, and chromium nitrate. Comparable results are obtained to those of Example 1.

EXAMPLE 15

Coagulum obtained by Example 1 is ground and screened to obtain particles of about 60 to 100 mesh. These particles are packed loosely in a column, and sour natural gas, high in hydrogen sulfide and also containing some mercaptans, is passed through the column. Analysis of the effluent gas shows that it has been materially sweetened by removal of $H_2S$ and mercaptans.

Although a large number of examples illustrating the practice of this process have been set forth, they are by no means exhaustive. The following metallic salts, for example, also form acceptable coagulums in the practice of this novel process: ferric sulfate, ferric nitrate, ferrous ammonium sulfate, ferrous sulfate, cobalt chloride, cobalt sulfate, zinc chloride, zinc sulfate, zinc nitrate, cadmium chloride, cadmium nitrate, cadmium sulfate, aluminum chloride, aluminum nitrate, gallium nitrate, gallium sulfate, gallium chloride, indium nitrate, indium sulfate, thallium chloride, thallium sulfate, thallium nitrate, stannous chloride, stannic chloride, lead chloride, lead tetrachloride, lead tetra-acetate, and samarium (III) chloride, to name a few.

Moreover, the present invention is not limited to the polysaccharide starting materials of the examples above. Polysaccharides generally may be used. For example, in addition to those previously mentioned, the following polysaccharides may be used as starting material: cooked rice and potato starches; dextrin, natural gums and mucilages such as gum arabic, gum ghatti, gum damar, gum tragacanth, psyllium seed hydrocolloid; and commercially modified products such as Polykol, Ipegon, Baroid's Impermex drilling mud starch, Lauhof's Foundry Binder and Niagara brand instant laundry starch, to name a few.

It appears that polysaccharides of low molecular weight, such as dextrin, form precipitates with greater difficulty than do polysaccharides of high molecular weight, such as grain sorghum starch. It further appears that polysaccharides having essentially unbranched molecular structures form precipitates more easily than do those polysaccharides with highly branched molecular structures. Accordingly, where precipitates from low molecular weight polysaccharides and highly branched polysaccharides are desired, the process should be practiced with close control of starting material concentrations, pH, rate of precipitant addition, rate of stirring, and selection of specific reactants which give optimum results with the particular polysaccharide being utilized.

Although metallic ions of oxidation numbers other than plus three have been found usable in the practice of this process to form coagulums, metallic ions of oxidation number plus three form these precipitates more easily. Thus, metallic ion salts with an oxidation number of plus three, such as ferric chloride, are preferred.

From what has been said, it is seen that this invention, broadly speaking, involves the substantially water insoluble metal-polysaccharide coagulum obtained by adding a base and a metal salt to an aqueous solution comprising a gelatinized polysaccharide material, under conditions in which final pH for coagulum formation is maintained to a value that is within about two units from neutral. While in aqueous solution, such a coagulum will have a particle size no smaller than one millimeter.

It has also been seen that the metal-polysaccharide composition of this invention may be used as the basis of a process to remove $H_2S$ and mercaptans from gas.

Although a preferred practice of the invention has been described in detail, it is to be understood that various changes, substitutions and alterations can be made therein without departing from the spirit and scope of the invention as defined by the appended claims.

What is claimed is:

1. The reaction product obtained as a substantially water insoluble coagulum by adding a base and a metal salt to an aqueous solution comprising a gelatinized polysaccharide material under conditions of moderate temperature and in which final pH for coagulum formation is maintained within a range that does not extend beyond about two units on either side of pH 7, said coagulum having a particle size no smaller than about one millimeter, and thereafter separating said coagulum from the solution.

2. A metallic-polysaccharide composition obtained as a coagulum by the process of:
   (a) forming an aqueous suspension of a substance comprising a quantity of at least partially gelatinized polysaccharide material,
   (b) adding to said aqueous suspension, which is maintained at moderate temperature, a base and a metallic, the metal in said salt having been positive valence of at least plus two and being a metal selected from the group of all metals except alkali metals and alkaline earth metals,
   (c) said base and said metallic salt being sequentially added to adjust pH from a value removed from pH 7 by at least about two units, which value prevails after the addition of one of said base and metallic salt, to a value closer to pH 7 to form a substantially water insoluble coagulum having a particle size no smaller than about one millimeter, and
   (d) collecting and drying said coagulum.

3. The product of claim 2 in which said suspension is maintained at a temperature of from between about 60° C. to about 80° C. during processing.

4. The product of claim 1 in which said metal salt is a salt of the ferric cation.

5. The product of claim 1 in which said polysaccharide material is grain sorghum.

6. The product of claim 4 in which said polysaccharide material is grain sorghum.

7. The process of forming a metallic-polysaccharide composition comprising of the steps of:
   (a) preparing an aqueous suspension of a substance comprising a quantity of an at least partially gelatinized polysaccharide material.
   (b) sequentially adding a base and a metallic salt of a metal other than an alkali metal or alkaline earth metal to said suspension, while said suspension is maintained at moderate temperature, to bring the pH of said suspension to within about two units of pH 7 and at which point a substantially water insoluble coagulum commences to form, (c) bringing said pH closer to pH 7 by further addition of reagent, base or metallic salt, as the case may be, to further promote growth of said coagulum and (d) collecting said coagulum.

8. The process of claim 7 in which said metallic salt is added first, followed by addition of said base.

9. The process of claim 7 in which said metallic salt is a salt of the ferric cation and in which said base is ammonium hydroxide.

10. The process of claim 7 in which said base is added first, followed by addition of said metallic salt.

11. The process of claim 10 in which said base is ammonium hydroxide and in which said metallic salt is a salt of the ferric cation.

12. The process of claim 7 further comprising drying said coagulum at a temperature above ambient.

13. The product of claim 1 in which the metal of said metal salt has a positive valence of 3.

14. The product of claim 2 in which the metal in said salt has a positive valence of 3.

15. The product of claim 14 in which said polysaccharide material is starch material.

References Cited

UNITED STATES PATENTS 3,338,828  8/1967  Clark _____ 210—52
3,142,637  7/1964  Cook _____ 210—52

DONALD E. CZAJA, Primary Examiner

M. T. MARQUIS, Assistant Examiner

U.S. Cl. X.R.

48—196; 106—205, 208, 210, 213; 210—52, 53